United States Patent [19]

Zimmermann et al.

[11] Patent Number: 4,880,870

[45] Date of Patent: Nov. 14, 1989

[54] POLYMER GRANULATE, A PROCESS FOR ITS PREPARATION, AND ITS USE

[75] Inventors: Wolfgang Zimmermann; Albrecht Harréus, both of Kelkheim, Fed. Rep. of Germany

[73] Assignee: Hoechst Aktiengesellschaft, Frankfurt, Fed. Rep. of Germany

[21] Appl. No.: 762,746

[22] Filed: Jul. 30, 1985

Related U.S. Application Data

[63] Continuation of Ser. No. 534,943, Sep. 21, 1983, abandoned.

[30] Foreign Application Priority Data

Sep. 23, 1982 [DE] Fed. Rep. of Germany ....... 3235189

[51] Int. Cl.$^4$ .................. B32B 5/16; B32B 27/06; B32B 27/08; C08J 3/06
[52] U.S. Cl. .................... 524/31; 427/195; 427/222; 428/403; 428/405; 428/407; 523/202; 523/203; 523/204; 523/205; 523/207; 524/45; 524/47; 524/405; 524/424; 524/447; 525/57
[58] Field of Search ............... 428/407, 403; 523/204, 523/205, 202; 524/405, 31, 45, 47, 424, 447; 427/222, 195; 525/57

[56] References Cited

U.S. PATENT DOCUMENTS

| | | | |
|---|---|---|---|
| 2,413,570 | 12/1946 | Krister et al. | 524/447 |
| 2,497,346 | 2/1950 | Collins | 106/198 |
| 2,718,471 | 9/1955 | Samler | 106/198 |
| 3,012,900 | 12/1961 | Kleinmann et al. | 428/407 |
| 3,015,572 | 1/1962 | Casey et al. | 524/47 |
| 3,600,342 | 8/1971 | Nickerson et al. | 524/405 |
| 3,668,166 | 6/1972 | Kane et al. | 524/405 |
| 3,720,633 | 3/1973 | Nickerson | 524/405 |
| 4,022,749 | 5/1977 | Kuechler | 106/198 |
| 4,042,529 | 8/1977 | Nimerick et al. | 428/407 |
| 4,058,124 | 11/1977 | Yen et al. | 523/204 |
| 4,256,805 | 3/1981 | Tugukuni et al. | 428/407 |
| 4,323,492 | 4/1982 | Zimmerman et al. | 525/57 |
| 4,626,472 | 12/1986 | Boutin | 408/407 |

Primary Examiner—Allan M. Lieberman
Attorney, Agent, or Firm—Berman, Aisenberg & Platt

[57] ABSTRACT

A polymer granulate whose particles consist of a core component and a coating component can be prepared by mixing a granular polymer with a pulverulent coating agent. The core component is made of a water-soluble polymer, in particular a polyvinyl alcohol. The coating component is a water-soluble or water-insoluble substance which is applied to the water-moistened particles of the core component. The particles of the polymer granulate have diameters within the range from 0.6 to 6 mm. The granulate has particularly good freeflowing properties; it is especially suitable for preparing adhesives.

27 Claims, No Drawings

POLYMER GRANULATE, A PROCESS FOR ITS PREPARATION, AND ITS USE

This application is a continuation of Ser. No. 534,943, filed Sept. 21, 1983, now abandoned.

The invention relates to a polymer granulate whose particles consist of a core component and a coating component, to a process for its preparation by mixing a granular polymer with a pulverulent substance, and to its use for preparing adhesives.

Water-soluble polymers, for example polyvinyl alcohol, are frequently used in combination with other substances, for example fillers, viscosity regulators and emulsifiers. These substances are usually stirred into an aqueous solution of the polymer, which procedure can lead to technical problems, such as pigment shock or incompatibility phenomena. It is also a disadvantage that the consumer has to keep a store of many individual substances. For this reason attempts have already been made to provide the consumer with powder mixtures or granulated mixtures which already contain whichever substances are required. However, commercially available mixtures of this type, for example of polyvinyl alcohol and boric acid or starch, tend to segregate as a result of the components differing in particle size and density, and they consequently have only a limited shelflife and transport life.

It is known that rubber particles which have been built up in stages essentially consist of a core, an outer sheath and an intermediate layer, where the core is made of a crosslinked elastomeric acrylic polymer, the outer sheath is made of a copolymer of methyl methacrylate and a hydroxyl-functional acrylate, and the intermediate layer is made of a copolymer which is composed of the monomers of the core and sheath components (cf. German Auslegeschrift 2,163,416 = U.S. Pat. No. 3,787,522). The rubber particles are built up by stepwise polymerization of suitable monomers. The rubber particles preferably have a mean diameter of 0.04 to 1 μm; they serve as a starting material for preparing heat-hardening molding powders.

Also known in a plasticizer-containing polyvinyl alcohol granulate which contains the plasticizer in a state of uniform dispersion and in which particles having diameters within the range from 0.4 to 4 mm predominate (cf. European patent publication No. 4,587 = U.S. Pat. No. 4,323,492). In this piece of prior art, the plasticizer is mixed into the polyvinyl alcohol in the presence of a small amount of water without dissolving the polyvinyl alcohol, and the temperature is raised and lowered again in such a way in the course of the mixing process as to cause the polyvinyl alcohol particles to swell and temporarily agglomerate. This granulate is suitable for preparing any type of shaped article, in particular film.

It is the object of the invention to provide a polymer granulate on the basis of a water-soluble polymer; the granulate should have good freeflowing properties and as uniform a particle size as possible.

The invention relates to a polymer granulate whose particles consist of a core component and a coating component and wherein the core component is a water-soluble polymer and the particles have diameters from 0.6 to 6 mm.

The invention also relates to a process for preparing a polymer granulate whose particles consist of a core component and a coating component by mixing a granular polymer with a pulverulent substance, which comprises uniformly coating a granular water-soluble polymer having particle diameters from 0.4 to 5 mm with a pulverulent substance having particle diameters from 0.01 to 1 mm in the presence of water in an amount of 10 to 20% by weight (based on the amount of water-soluble polymer).

The invention also relates to the use of the abovementioned polymer granulate as a starting material for preparing adhesives and coatings.

The core component is a granular water-soluble polymer having particle diameters from 0.4 to 5 mm, preferably from 0.5 to 3.5 mm. This polymer is synthetic, cellulosic or natural. Examples of suitable polymers are starch, starch derivatives, carboxymethylcellulose, polyacrylamide, polyacrylic acid salts, salts of acrylic acid copolymers, crotonic acid copolymers, casein, gelatin and, in particular, polyvinyl alcohol. The polyvinyl alcohol is prepared in a known manner, namely by hydrolysis, preferably by alcoholysis, of polyvinyl esters, preferably polyvinyl acetate (cf., for example, German Pat. No. 1,720,709 = British Pat. No. 1,168,757). A 4% by weight strength aqueous solution of the polyvinyl alcohol has a viscosity of 3 to 70, preferably 10 to 60, mPa.s (measured at a temperature of 20° C.). The ester number of the polyvinyl alcohol is within the range from 10 to 250, preferably 20 to 200, mg of KOH/g.

The coating component is a pulverulent substance having particle diameters from 0.01 to 1 mm; it is in every case more finely granular than the core component. This powder is a water-soluble compound or a water-insoluble compound. Suitable water-soluble compounds are organic compounds, such as amidosulfonic acid and urea, and inorganic compounds, such as alkali metal phosphates, potassium iodide, titanates, boric acid, sodium chloride, aluminum salts and chromium salts. Suitable water-insoluble compounds are, in particular, pigments, such as chalk, heavyweight spar, lightweight spar, titanium dioxide, silicon carbide and kaolin. If polyvinyl alcohol is the core component used, the compounds preferred for the coating component should be capable of forming complexes with polyvinyl alcohol. The coating component, like the core component, can also be a water-soluble organic polymer, for example a polyvinyl alcohol, starch or a cellulose derivative, such as carboxymethylcellulose, where the polymers differ from each other in quality.

The core component also differs from the coating component in terms of particle size distribution as measured by DIN 4,190 (Rosin-Rammler-Sperling diagram). The core component preferably has a distribution in which D 10% is at most 0.9 mm and D 90% is at most 5 mm. The coating component preferably has a distribution in which D 10% is at most 0.02 mm and D 90% is at most 0.9 mm. The core component and the coating component are used in a weight ratio of 50:50 to 98:2, preferably 70:30 to 95:5.

The materials which form the core component and the coating component are mixed with each other at a temperature of 15 to 30° C.; it is necessary to supply additional heat. The mixing takes place in the presence of water used in an amount of 10 to 20, preferably 5 to 15, % by weight (based on the core component). The water may be sprayed in the form of a mist into the mixer which already contains at least the core component. The mixing is carried out in a commercially available mixer, preferably on a continuous basis. Examples of suitable mixers are tumblers, planetary mixers, forced-circulation mixers, pelletizers, rotary tube dryers and tube bundle dryers.

The process of the invention can take two forms: either the core component is first mixed with the coating component and the water is added thereafter, or the core component is first moistened with the water and the coating component is added thereafter. The first version is advisable in those cases where the coating component is a compound which is insoluble or sparingly soluble in water. The second version is advisable in those cases where the coating component is a water-soluble component; this way is also suitable for applying several layers of coating component of the polymer particles ends up with a multilayer structure.

The mixing process takes at most 30 minutes when the mixer used has a mild mixing effect on the material. In the case of mixers with a high mixing effect (stirring speed), the mixing will only take at most 10 minutes. The end of the mixing process can be recognized by the fact that the coating component no longer raises dust in the mixing vessel. The granulate obtained by the mixing is also dried, if appropriate, at a temperature of 100 to 120° C., preferably 105 to 115° C. The drying can also take place in an inert gas atmosphere, preferably under nitrogen. The drying period advantageously lasts 30 to 90, preferably 50 to 70, minutes.

If polyvinyl alcohol is used as the core component, it is a particular embodiment of the process according to the invention that the polyvinyl alcohol is used in the form of a granular gel which contains at least 85% by weight of polyvinyl alcohol. This gel preferably contains a low alkanol, such as methanol or ethanol, as dispersing medium (liquid phase).

The polymer granulate of the invention contains at most 30, preferably 3 to 15, % by weight of constituents which are volatile at 100 to 120° C. and which are essentially water. The solids content of the polymer granulate is correspondingly at least 70, preferably 85 to 97, % by weight. It is perfectly freeflowing and has a long shelflife and transportlife. It does not cake into blocks in the course of storage on the shelf, nor is the there any detectable abrasion in the course of transport. It is particularly suitable for use as starting material for preparing adhesives and coatings.

The following examples serve to illustrate the invention in more detail. Percentages are always by weight.

EXAMPLE 1

6 kg of a polyvinyl alcohol whose 4% strength aqueous solution had a viscosity of 20 mPa.s at a temperature of 20° C. and which has an ester number of 20 mg of KOH/g were introduced into a commercially available 35-liter forced-circulation mixer, and 300 g of boric acid were added. The polyvinyl alcohol had the following particle size distribution: D 10%=0.9 mm, D 50%=1.4 mm, D 90%=2.6 mm; the particle size distribution of the boric acid was as follows: D 10%=0.025 mm, D 50%=0.09 mm, D 90%=0.14 mm. 480 g of water were then added in the course of 30 seconds, and the components were mixed with one another at a temperature of 20° C. and a stirrer speed of 1200 r.p.m. for 3 minutes. This gave a non-blocking non-dusting polymer granulate which had good freeflowing properties and whose particles had diameters within the range from 1.0 to 2.8 mm. Following drying at 110° C. for 1 hour, the granulate contained 12.2% of volatile constituents.

EXAMPLE 2

6 kg of a polyvinyl alcohol whose 4% strength aqueous solution had a viscosity of 18 mPa.s at a temperature of 20° C. and which had an ester number of 140 mg of KOH/g were introduced into a commercially available 35-liter forced-circulation mixer. The polyvinyl alcohol had the following particle size distribution: D 10%=1 mm, D 50%=1.7 mm, D 90%=2.5. mm. 700 g of water were added in the course of 1 minute at a temperature of 20° C. and a stirrer speed of 1200 r.p.m., followed immediately thereafter by 1.2 kg of potato starch which had the following particle size distribution: D 10%=0.05 mm, D 50%=0.07 mm, D 90%=0.1 mm. Mixing for 4 minutes produced a non-blocking non-dusting polymer granulate which had good freeflowing properties and whose particles had diameters within the range from 1.8 to 5 mm. Following drying at 110° C. for 1 hour, the granulate contained 10.4% of volatile constituents.

EXAMPLE 3

1 kg of the polyvinyl alcohol used in Example 1 were introduced into a 2-liter planetary mixer and were sprayed with 100 g of water at a temperature of 20° C. and a stirrer speed of 150 r.p.m. 500 g of carboxymethyl cellulose having the following particle sized distribution: D 10%=0.1 mm, D 50%=0.2 mm, D 90%=0.3 mm, were then added. Mixing for 10 minutes produced a non-blocking non-dusting polymer granulate which had good freeflowing properties and whose particles had diameters within the range from 2 to 6 mm. Following drying at 110° C. for 1 hour, the granulate contained 11.2% of volatile constituents.

EXAMPLE 4

2 kg of the polyvinyl alcohol whose 4% strength aqueous solution had a viscosity of 10 mPa.s at a temperature of 20° C. and which had an ester number of 18 mg of KOH/g were introduced into a commercially available tumbler, and 300 g of kaolin (China Clay SPS) were added. The polyvinyl alcohol had the following particle size distribution: D 10%=0.25 mm, D 50%=0.7 mm, D 90%=1.4 mm; the particle size distribution of the kaolin was as follows: D 10%=0.02 mm, D 50%=0.04 mm, D 90%=0.09 mm. 120 g of water were then sprayed in as the mixture introduced first was kept in constant agitation. Mixing for 25 minutes produced a freeflowing non-blocking non-dusting polymer granulate whose particles had diameters within the range from 0.4 to 1.8 mm. Following drying at 110° C. for 1 hour the granulate contained 9.3% of volatile constituents.

EXAMPLE 5

6 kg of a gelatin having a particle size distribution of D 10%=1.5 mm, D 50%=1.6. mm and D 90%=1.7 mm were introduced into a commercially available 35-liter forced-circulation mixer. 700 g of water were added in the course of 1 minute at a temperature of 20° C. and at a stirrer speed of 1200 r.p.m., followed immediately thereafter by 900 g of a polyvinyl alcohol of the following specification: viscosity of a 4% strength aqueous solution at 20° C.-4 mPa.s; ester number-140 mg of KOH/g; and particle size distribution D 10%=0.05 mm, D 50%=0.1 mm; D 90%=0.32 mm. Mixing for 3 minutes produced a non-blocking non-dusting polymer granulate which had good freeflowing properties and whose particles had diameters within the range from 1.6 to 1.8 mm.

EXAMPLE 6

8 kg of a polyvinyl alcohol whose 4% strength aqueous solution had a viscosity of 8 mPa.s at a temperature of 20° C. and which had an ester number of 138 mg of KOH/g were introduced into a commercially available 35-liter forced-circulation mixer, and 700 g of silicon carbide were added. The polyvinyl alcohol had the following particle size distribution: D 10%=0.75 mm, D 50%=1.5 mm, D 90%=2.5 mm. The particle size distribution of the silicon carbide was as follows: D 10%=0.015 mm, D 50%=0.023 mm, D 90%=0.038 mm. 490 g of water were then added in the course of 30 seconds. Mixing for 2 minutes at a temperature of 20° C. and a stirrer speed of 1200 r.p.m. produced a non-blocking non-dusting polymer granulate which had good freeflowing properties and whose particles had diameters within the range from 0.8 to 2.6 mm. Following drying at 110° C. for 1 hour, the granulate contained 10.7% of volatile constituents.

EXAMPLE 7

1 kg of a granular methanolic gel which contained 50% of a polyvinyl alcohol having the specification mentioned in Example 1 were concentrated to a solids content of 90% in a rotary evaporator (flask content: 2 liters) at a temperature of 105° C. in an atmosphere of nitrogen. 50 g of the boric acid used in Example 1 were then added, followed immediately thereafter by 50 g of water and all the components were mixed with one another at a constant temperature of 105° C. for 5 minutes. This gave a non-blocking non-dusting polymer granulate which had good freeflowing properties and whose particles had diameters within the range from 1.0 to 2.8 mm.

EXAMPLE 1

150 g of the polymer granulate obtained in Example 1 were dissolved at a temperature of 90° C. in 850 g of water in an indirectly heated glass flask to give a 15% strength solution. This solution was brought to pH 6.8 by means of a 7% strength aqueous solution of disodium hydrogenphosphate. The adhesive thus obtained had a viscosity of 32 Pa.s as measured at 20° C. in a an Epprecht viscometer on the D/III spindle; there was no sign of ropiness, and it was possible, without problems, to use the adhesive on a commercially available labeling machine for sticking paper labels to glass bottles.

USE EXAMPLE 2

200 g of the polymer granulate obtained in Example 2 were dissolved at a temperature of 95° C. in 800 g of water in a 2-liter planetary mixer to give a 20% strength opaque solution. The adhesive thus obtained had a viscosity of 8 Pa.s as measured at 20° C. in an Epprecht viscometer on the D/III spindle; there was no sign of ropiness, and it was possible, without problems, to use the adhesive on a commercially available labeling machine for sticking paper labels to glass bottles.

We claim:

1. A polymer granulate which is useful for preparing adhesives or coatings and whose particles consist of a core component and a coating component in a weight ratio of 50 to 98:50 to 2, wherein the core component is a water-soluble granular polyvinylalcohol, the coating component is more finely granular than the core component and is a member selected from the group consisting of boric acid, starch, a cellulose derivative, kaolin, silicon carbide and polyvinylalcohol, and the particles have diameters from 0.6 to 6 mm.

2. A polymer granulate as claimed in claim 1, wherein the coating component is a water-soluble compound.

3. A polymer granulate as claimed in claim 2, wherein the water-soluble compound is an organic polymer which differs from the polymer of the core component.

4. A polymer granulate as claimed in claim 1, wherein the coating component is a water-insoluble compound.

5. A polymer granulate as claimed in claim 2, wherein the coating component is a compound which can form a complex with polyvinyl alcohol.

6. A polymer granulate as claimed in claim 1 having a weight ratio of core component to coating component of from 70:30 to 95:5.

7. A polymer granulate as claimed in claim 1 having at most 30 percent by weight of constituents which are volatile at from 100° to 120° C. and at least 70 percent by weight of solids.

8. A polymer granulate as claimed in claim 1 having from 3 to 15 percent by weight of constituents which are volatile at from 100° to 120° C. and from 85 to 97 percent by weight of solids.

9. A polymer granulate as claimed in claim 1 wherein the coating component is boric acid.

10. A polymer granulate as claimed in claim 6 wherein the coating component is boric acid.

11. A polymer granulate as claimed in claim 1, which contains at most 30% by weight of constituents which are volatile at from 100° to 120° C. and wherein the core component has a particle size distribution in which D 10% is at most 0.9 mm and D 90% is at most 5 mm.

12. A polymer granulate as claimed in claim 11, wherein constituents which are volatile at from 100° to 120° C. are essentially water.

13. A polymer granulate as claimed in claim 12, wherein the coating component is a water-insoluble compound.

14. A polymer granulate as claimed in claim 12, wherein the coating component is a water-soluble compound which can form a complex with polyvinyl alcohol.

15. A polymer granulate according to claim 1, any essential non-solid constituent of which is volatile at 120° C.

16. A polymer granulate according to claim 1 wherein the core component is in granular gel form and contains, as dispersing medium, a lower alkanol.

17. In a method which comprises preparing an adhesive or a coating from a polymer, the improvement wherein the polymer is a polymer granulate as claimed in claim 12.

18. A process for preparing a polymer granulate, whose particles consist of from 50 to 98 per cent by weight of a core component and from 50 to 2 per cent by weight of a coating component, by mixing a granular polymer with a pulverulent substance at a temperature of from 15° to 30° C., which comprises coating granular water-soluble polyvinyl alcohol having particle diameters from 0.4 to 5 mm with a pulverulent substance having particle diameters from 0.01 to 1 mm in the presence of water in an amount of 10 to 20% by weight (based on the amount of water-soluble polyvinyl alcohol), the pulverulent substance being a member selected from the group consisting of boric acid, starch, a cellulose derivative, kaolin, silicon carbide and polyvinyl alcohol.

19. The process as claimed in claim 18, wherein the granular water-soluble polyvinyl alcohol is in the form of a gel which contains at least 85% by weight of polyvinyl alcohol.

20. The process as claimed in claim 18, which is carried out on a continuous basis.

21. A process as claimed in claim 18 wherein the granular polymer and the pulverulent substance are in a weight ratio of from 70:30 to 95:5.

22. A process as claimed in claim 18 which comprises mixing the core component and the coating component with each other for a period of from 10 to 30 minutes.

23. A process as claimed in claim 18 wherein the coating component is boric acid.

24. A process as claimed in claim 18, which wherein the core component have a particle size distribution in which D 10% is at most 0.9 mm and D 90% is at most 5 mm.

25. In a method for preparing an adhesive or coating material which comprises dissolving polymer in water, the improvement wherein the polymer is a polymer granulate as claimed in claim 12.

26. In a method which comprises preparing an adhesive or a coating from a polymer, the improvement wherein the polymer is a polymer granulate as claimed in claim 1.

27. A process according to claim 18 for preparing a polymer granulate, any essential non-solid constituent of which is volatile at 120° C.

* * * * *